(12) United States Patent
Dultz et al.

(10) Patent No.: US 6,986,056 B1
(45) Date of Patent: Jan. 10, 2006

(54) METHOD AND ARRANGEMENT FOR GENERATING BINARY SEQUENCES OF RANDOM NUMBERS

(75) Inventors: Wolfgang Dultz, Frankfurt am Main (DE); Gisela Dultz, Frankfurt am Main (DE); Eric Hildebrandt, Frankfurt am Main (DE); Heidrun Schmitzer, Regensburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/402,322

(22) PCT Filed: Dec. 10, 1998

(86) PCT No.: PCT/EP98/08057

§ 371 (c)(1),
(2), (4) Date: Jan. 20, 2000

(87) PCT Pub. No.: WO99/39434

PCT Pub. Date: Aug. 5, 1999

(30) Foreign Application Priority Data

Feb. 2, 1998 (DE) .......................... 198 06 178

(51) Int. Cl.
*H04L 9/00* (2006.01)
*H04L 9/32* (2006.01)
*G06F 11/30* (2006.01)
*G06F 12/14* (2006.01)
*H04K 1/00* (2006.01)

(52) U.S. Cl. .................. 713/200; 380/256; 380/262
(58) Field of Classification Search .............. 380/44, 380/46
See application file for complete search history.

(56) References Cited

U.S. PATENT DOCUMENTS

| | | | | |
|---|---|---|---|---|
| 3,575,669 A | * | 4/1971 | Haeff | ............................ 372/89 |
| 4,687,935 A | | 8/1987 | Nurmi et al. | |
| 5,307,410 A | * | 4/1994 | Bennett | ...................... 380/256 |
| 5,323,010 A | * | 6/1994 | Gratton et al. | ........... 250/458.1 |
| 5,966,224 A | * | 10/1999 | Hughes et al. | ................ 398/40 |
| 5,999,285 A | * | 12/1999 | Brandt et al. | ............... 398/212 |

OTHER PUBLICATIONS

Rarity et al., "Quantum Random–Number Generation and Key Sharing," Journal of Modern Optics, Bd. 41, Nr. 12, Dec. 1994.
Takeuchi et al., "High Performance Random Pulsar Based on Photon Counting," IEEE Transactions on Nuclear Science, Bd. NS–33, Nr. 1, Feb. 1986.
Tang et al., "Monte Carlo calculation for random numbers produced by an optical method," Wuli, (China), Jun. 1987.
*Manfred Richter, "Ein Rauschgenerator zur Gewinnung von quasiidealen Zufallszahlen für die stochastische Simulation," Dissertation RWTH Aachen, 1992.
*Martin Gude, "Ein quasi–idealer Gleichverteilungsgenerator basierend auf physikalischen Zufallsphänomenen," Dissertation, RWTH Aachen, 1987.

* cited by examiner

*Primary Examiner*—Thomas R. Peeso
*Assistant Examiner*—Cas Stulberger
(74) *Attorney, Agent, or Firm*—Kenyon & Kenyon

(57) ABSTRACT

A method and arrangement for generating binary sequences of random numbers uses the principle of random selection of the path of photons on a beam splitter and generating a random number by using two detectors ($D1_0$, $D2_1$) downstream from a beam splitter (ST2). To generate photons, a light source (L) of a low power is used, and an additional beam splitter (ST1) is connected upstream from the beam splitter (ST2). The photons emitted by the light source (L) during a predefined measurement time are split by the beam splitters (ST1, ST2) arranged one after the other in the beam path of the light source (L). The random sequence is generated when the splitting of the photons matches a predefined photon scheme.

11 Claims, 1 Drawing Sheet

METHOD AND ARRANGEMENT FOR GENERATING BINARY SEQUENCES OF RANDOM NUMBERS

FIELD OF THE INVENTION

The present invention relates to an arrangement and method for generating binary sequences of random numbers.

RELATED TECHNOLOGY

Random numbers are used in mathematical simulation of random processes, in random sampling and in cryptology in particular. Due to increasing high-bit-rate digital communications over publically accessible communication channels, guaranteeing the confidentiality and authenticity of the information transmitted has become a central problem. Good cryptographic codes are sequences of random binary numbers. For secure encoding, preferably a random code of this type is selected; this code is as long as the message itself and is used only once.

Essentially two different options are available for generating random numbers:

1. Pseudo-Random Numbers Generated by Mathematical Algorithms

Essentially, true random numbers cannot be generated by a computer, which operates completely deterministically. Therefore, the random numbers generated by mathematical algorithms and provided by many programs are never truly random. Pseudo-random numbers, developed from a shorter, truly random nucleus are an improvement.

In any case, however, a certain number of sequences that are not usable from the beginning (weak keys) must be expected in generating pseudo-random numbers by the methods described above, and in any case, odd correlations must be expected.

2. Random Numbers Based on Physical Methods

These methods make use of the random character of certain physical processes.

Even with the physical methods, there are those which are fundamentally deterministic, but are so complex that they cannot be reproduced. This would include, for example, a coin throw of heads or tails or lotto machines. These methods generate a deterministic chaos, which may be considered random because the initial conditions of the generator in generating each individual random number are always slightly different each time, without this difference being quantifiable. The physical methods also include elementary processes, such as those in quantum mechanics. Such processes are naturally basically random. Random numbers generated by physical processes therefore come closer to the concept of a random sequence than do random numbers generated by an algorithm.

There is a known solution utilizing the natural quantum process of the electromagnetic noise of a resistor or a diode to generate random bit sequences (see Manfred Richter: "Ein Rauschgenerator zur Gewinnung von quasiidealen Zufallszahlen für die stochastische Simulation" [A noise generator for generating quasi-ideal random numbers for stochastic simulation], Dissertation RWTH Aachen; 1992). However, such methods can be manipulated externally by superimposing an arbitrary predetermined "noise" on the quantum noise, e.g., from incident electromagnetic waves. Since it is not easy to separate quantum noise from such an externally imposed pseudo-noise, these methods are not considered to be secure.

In addition, there are known methods of generating random numbers based on radioactive decay processes (see Martin Gude: "Ein quasi-idealer Gleichverteilungsgenerator basierend auf physikalischen Zufallsphänomenen" [A quasi-ideal uniform distribution generator based on physical random phenomena], Dissertation, RWTH Aachen 1987). This method is very suitable for generating random sequences because of the high energy of the resulting particles, but in addition to the very real risks, due in particular to the potentially harmful effect of radioactive radiation on humans, there is also an irrational prejudice against radioactivity on the part of some of the population, so that radioactive processes cannot readily be used for random generation.

Another known method of generating random sequences is based on the process of selecting the path of individual photons on a beam splitter (see J. G. Rarity et al.: "Quantum random-number generation and key sharing" J. Mod. Opt. 41, p. 2435, 1994 which is hereby incorporated by reference herein). In this method, a light quantum is reflected or transmitted on a semitransparent mirror, for example; two detectors record the light quantum and their displays represent the "0" or "1" of the random sequence.

SUMMARY OF THE INVENTION

An object of the present invention is to provide a method and an arrangement for generating binary sequences of random numbers to avoid the disadvantages described above, while being less expensive than prior methods and suitable for integration onto a chip card without any great complexity.

The present invention provides a method of generating a binary sequence of random numbers based on random selection of a path of photons on a beam splitter, the method including emitting photons or photon swarms according to a randomness principle using a photon source, the photon source including a low power light source; splitting the photons or photon swarms emitted by the photon source during a measurement period using at least a first beam splitter and a second beam splitter disposed in a beam path of the light source, the second beam splitter being disposed downstream of the first beam splitter in a first downstream path of the first beam splitter; detecting, in accordance with the splitting, the photons or photon swarms from the splitting using a first, a second and a third detector connected to a detection device, the first detector being disposed in a second downstream path of the first beam splitter, the second detector being disposed in a third downstream path of the second beam splitter, the third detector being disposed in a fourth downstream path of the second beam splitter; generating a random number when the photons or photon swarms detected at the first, second and third detectors together correspond to a predefined photon scheme, the photon scheme including generating a random number when only one of the second and third detectors registers a detection of the photons or photon swarms.

The present invention also provides an apparatus for generating a binary sequence of random numbers, the apparatus including a low power light source including a photon source for emitting individual photons and/or photon swarms according to a randomness principle; a first and a second beam splitter disposed downstream from the light source in a beam path of the light source, the first beam splitter being disposed between the light source and the second beam splitter; a first detector disposed in a downstream path of the first beam splitter; a second detector and a third detector disposed in a first and a second downstream path, respectively, of the second beam splitter; a detection device for generating the random numbers, the detection device being disposed downstream from the first, second and third detectors, the detection device including at least one counter and computer.

The method according to the present invention uses the known principle of selecting the path of individual photons on a beam splitter. With the method according to the present invention, ultraviolet, visible or infrared light strikes an optical beam splitter, e.g., a semitransparent mirror. Two detectors which can detect individual photons register the photons and define the "0" or the "1" of the random sequence via the displays assigned to them and thus define the random sequence itself.

With the method according to the present invention, a photon source of a low power and thus also small dimension is used as light source L instead of the photon source customary in the past, such as an attenuated laser beam source. For example, attenuated laser diodes, normal diodes (LEDs), thermal light sources such as halogen lamps, spectral lamps or pinched light sources are suitable. In addition, according to the present invention, a first beam splitter ST1, preferably a trigger beam splitter, is inserted into the beam path of light source L upstream from second beam splitter ST2. The photons/photon swarms emitted during a predefined measurement time by light source L according to the random principle are split by beam splitters ST1 and ST2 arranged in the beam path of light source L and are detected by detectors (trigger detector DT for beam splitter ST1 and detectors $D1_0$ and $D2_1$ for beam splitter ST2) downstream from beam splitters ST1 and ST1 according to the split.

Detectors DT, $D1_0$ and $D2_1$ are connected to detection unit E. A random number is generated only if the photons registered at the individual detectors DT, $D1_0$ and $D2_1$ correspond in their totality to a previously defined photon count scheme which has been input into the computer of the detection unit.

BRIEF DESCRIPTION OF THE DRAWINGS

Embodiments

The present invention is explained in greater detail below with reference to the drawing, in which.

DETAILED DESCRIPTION

Figure 1:
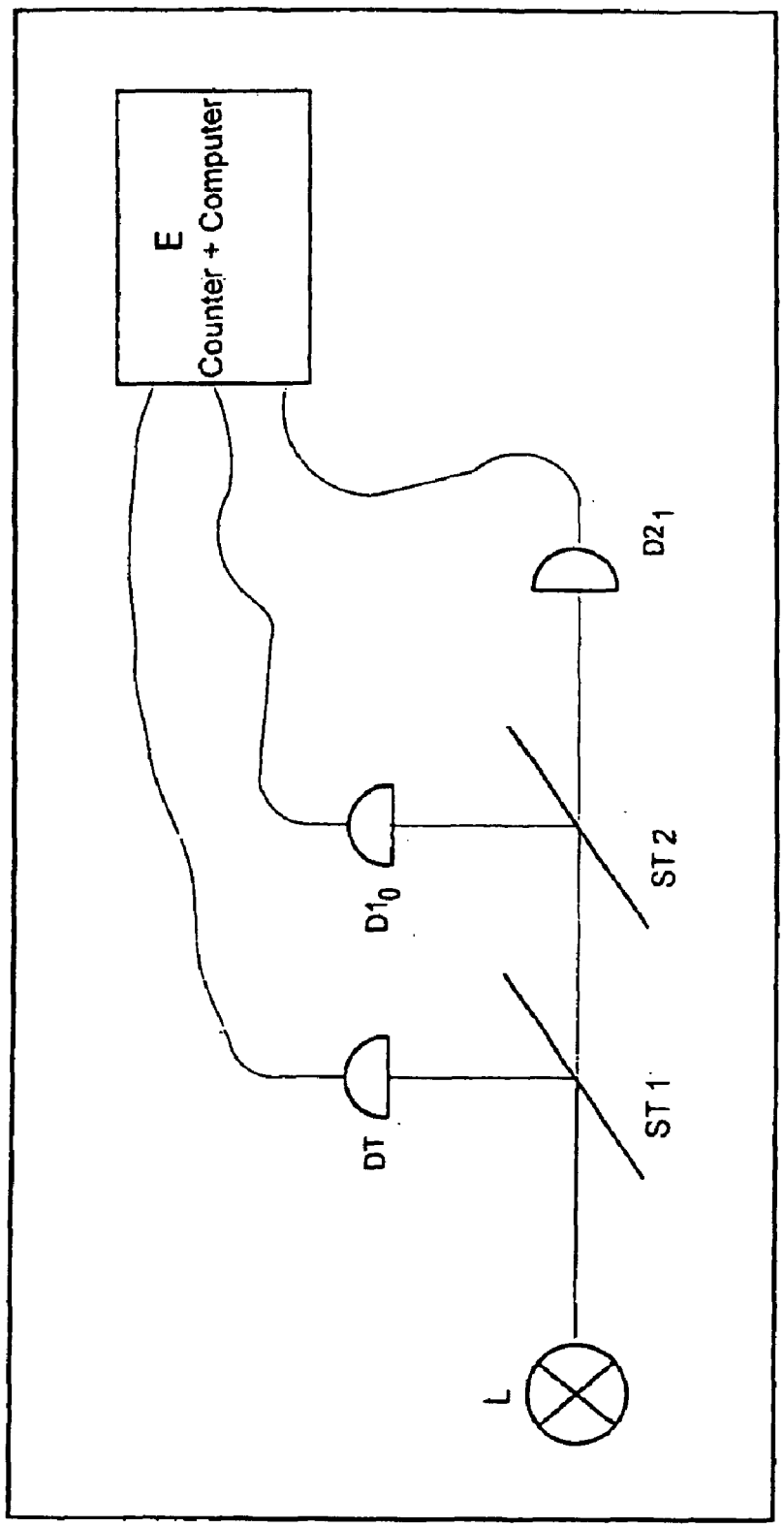
FIG. 1 shows a schematic representation of an arrangement for generating binary sequences.

Referring to FIG. 1, light source L has such a weak light intensity that it emits individual photons or it always emits photon swarms of n photons with a certain probability. These photon swarms are then either resolved in detectors DT, $D1_0$ and $D2_1$ or counted as a whole as a single result. Probability $p_n$ that n photons will arrive at the detector at the same time or will be counted as a single result is described by a Poisson distribution.

$$p_n = \frac{\bar{n}^n}{n!} e^{-\bar{n}} \quad (1)$$

$\bar{n}$ is the average number of photons at the detector per measurement time. Although the light source has different statistics if it is thermal light (halogen lamp), chaotic light (spectral line) or laser light, equation (1) applies to all these light sources as long as the coherent time of a thermal or chaotic source is short in comparison with the measurement time of the detector. Equation (1) always applies to laser light. With a simple beam splitter with two detectors, as illustrated by beam splitter ST2 and detectors $D1_0$ and $D2_1$ in FIG. 1, the electronics of the counting processes are set up so that a result is only ever counted when only one of detectors $D1_0$ or $D2_1$ responds. If both detectors $D1_0$ and $D2_1$ respond within the measurement time, the counting event is discarded. If a swarm of photons is split on beam splitter ST2, the result is not used. A counting event is used only if the swarm enters detector $D1_0$ completely or enters detector $D2_1$ completely and is counted. With a swarm of n photons, this means that only 2 of n+1 events are counted, and therefore, equation (1) is to be multiplied by $$\frac{2}{n+1}$$

to describe the probability with which counting events occur with a photon swarm. Therefore, probability $p_n$ that a usable counting event will occur at an average photon count $\bar{n}$ is as follows for the simple beam splitter, corresponding to beam splitter ST2, and one of the light sources L of a low power described above $$p_n^{(1)} = \frac{\bar{n}^n}{n!} e^{-\bar{n}} \cdot \frac{2}{n+1} \quad \text{simple beam splitter} \quad (2)$$

According to the present invention, another beam splitter ST1, preferably a trigger beam splitter, is connected upstream from simple beam splitter ST2 (FIG. 1). As in the first case, the electronic counters of both detectors $D1_0$ and $D2_1$ are connected so that a random number is determined only when only one or only the other detector $D1_0$ or $D2_1$ responds. In addition, however, trigger detector DT of beam splitter ST1 must not respond in this case. Transit time effects between trigger detector DT of first beam splitter ST1 and detectors $D1_0$ and $D2_1$ of second beam splitter ST2 are compensated optically or electronically. If there is a swarm of n photons and at least one photon of the swarm reaches trigger detector DT, the event is not counted. An event is counted as (0) or (1) only if no photon goes over first beam splitter ST1 to trigger detector DT and also if all n photons at second beam splitter ST2 go either completely to detector $D1_0$ or completely to detector $D2_1$. The probability that no photon of the swarm will go to trigger detector DT and the rest will go completely to one of detectors $D1_0$ or $D2_1$ is $4/((n+1)(n+2))$, i.e., the probability $p_n^{(2)}$ that a counting event will occur with a swarm of n photons is $$p_n^{(2)} = \frac{\bar{n}^n}{n!} e^{-\bar{n}} \cdot \frac{4}{(n+1)(n+2)} \quad \begin{array}{l}\text{beam splitter } ST2 \text{ with} \\ \text{beam splitter } ST1 \text{ connected upstream}\end{array} \quad (3)$$

Equation (3) applies to the case when beam splitter ST1 has splitting ratio 1/3:2/3, but beam splitter ST2 has splitting ratio 1/2:1/2. In this case, three detectors DT, $D1_0$ and $D2_1$ are weighted equally. Other splitting ratios are possible, but they alter the probabilities according to equation (3).

The method according to the present invention makes it progressively less likely that, with an increasing number n of photons emitted during a predefined measurement time, an n-photon swarm will lead to a counting event and thus to a random number. However, there is an increase in the probability that the ideal case in terms of quantum mechanics will occur, namely generation of a random event by a single photon on the beam splitter. Multi-photon events, which in the limit case of greater than n go into the conventional state, are suppressed. Thus, according to the present invention, weak lasers, chaotic or thermal light sources can be used as random generators.

An arrangement of more than one trigger beam splitter in the beam path between light source L and beam splitter ST2 is also conceivable. The trigger detectors of these additional trigger beam splitters are also connected to detection device E. In such an embodiment, the photons detected during the predefined measurement time are registered in the detection device in accordance with their assignment to the individual trigger beam splitters (including beam splitter ST2) and are likewise compared with a predetermined photon scheme stored in detection device E. In such an embodiment, photon swarms are suppressed to an even greater extent. Random events are recorded, for example, only when none of the trigger detectors responds.

Another defined or variable photon scheme may also be selected with an embodiment having multiple trigger detectors in the beam path of light source L. For example, the photon scheme may include the fact that the trigger detector of every second trigger beam splitter must respond or that only the trigger detector of the first and seventh trigger beam splitter must respond. In each of these cases, the counting probability for the photon swarm is reduced.

An interesting example is an arrangement according to FIG. 1, where the random events at second beam splitter ST2 are counted only when one or more photons are registered by trigger detector DT of beam splitter ST1. In this case, swarms with only one photon are not used at all for random generation. Since detectors today also have some very unpleasant properties, such as a low quantum efficiency and dead times, the trade-in for additional trigger beam splitters is also additional electronic problems and higher costs. Thus, in practice, preferably only one additional trigger beam splitter is used.

| List of reference notation | |
| --- | --- |
| L | light source |
| ST1 | first beam splitter (trigger beam splitter) |
| ST2 | second beam splitter |
| E | detection device |
| DT | trigger detector of the first beam splitter |
| $D1_0, D2_1$ | detectors of the second beam splitter |
| n | number of photons emitted by the light source during a defined measurement time |

What is claimed is:

1. A method of generating a binary sequence of random numbers based on random selection of a path of photons on a beam splitter, the method comprising:
   emitting photons or photon swarms according to a randomness principle using a photon source, the photon source including a low power light source;
   splitting the photons or photon swarms emitted by the photon source during a measurement period using at least a first beam splitter and a second beam splitter disposed in a beam path of the light source, the second beam splitter being disposed downstream of the first beam splitter in a first downstream path of the first beam splitter;
   detecting, in accordance with the splitting, the photons of photon swarms from the splitting using a first, a second and a third detector connected to a detection device, the first detector being disposed in a second downstream path of the first beam splitter, the second detector being disposed in a third downstream path of the second beam splitter, the third detector being disposed in a fourth downstream path of the second beam splitter;
   generating a random number when the photons or photon swarms detected at the first, second and third detectors together correspond to a predefined photon scheme, and photon scheme including generating a random number when only one of the second and third detectors registers a detection of the photons of photon swarms.

2. The method as recited in claim 1 wherein the photon scheme includes generating a random number when during the measurement period no photon of the photons of photon swarms is detected at the first detector and at least one photon of the photons or photon swarms is detected at only one of the second and third detectors.

3. The method as recited in claim 1 wherein the photon scheme includes generating a random number when during the measurement period at least one photon of the photons or photon swarms is detected at the first detector and at least one photon of the photons or photon swarms is detected at only one of the second and third detectors.

4. The method as recited in claim 1 wherein the at least a first and second beam splitters includes at least a third beam splitter disposed in the beam path between the light source and the second beam splitter, each of the at least a third beam splitter including an associated fourth detector disposed in a respective downstream path of the associated at least a third beam splitter, the photon scheme including generating a random number only when a photon swarms of the photons or photon swarms including a number of photons defined by the photon scheme is detected at the first, second, third and fourth detectors.

5. An apparatus for generating a binary sequence of random numbers, the apparatus comprising:
   a low power light source including a photon source for emitting individual photons and/or photon swarms according to a randomness principle;
   a first and a second beam splitter disposed downstream from the light sources in a beam path of the light source, the first beam splitter being disposed between the light source and the second beam splitter;
   a first detector disposed in a downstream path of the first beam splitter;
   a second detector and third detector disposed in a first and a second downstream path, respectively, of the second beam splitter; and
   a detection device for generating the random numbers, the detection device being disposed downstream from the first, second and third detectors, the detection device including at least one counter and computer.

6. The apparatus as recited in claim 5 wherein the first beam splitter includes a trigger beam splitter and the first detector includes a trigger detector.

7. The apparatus as recited in claim 5 wherein the photon source includes as attenuated laser.

8. The apparatus as recited in claim 5 wherein the photon source includes a thermal light source.

9. The apparatus as recited in claim 5 wherein the photon source includes a spectral lamp.

10. The apparatus as recited in claim 5 wherein the photon source includes a light emitting diode.

11. The apparatus as recited in claim 5 wherein the photon source includes a pinched light source.

\* \* \* \* \*